March 31, 1936.  A. B. BROUGHTON-EDGE  2,035,943

METHOD OF DETERMINING THE NATURE OF THE SUBSOIL

Filed April 30, 1931 a. B. Broughton-Edge
INVENTOR

By: Maclotlee
ATTYS.

Patented Mar. 31, 1936

2,035,943

UNITED STATES PATENT OFFICE 2,035,943

METHOD OF DETERMINING THE NATURE OF THE SUBSOIL

Arthur Broughton Broughton-Edge, London, England

Application April 30, 1931, Serial No. 534,106
In Great Britain June 23, 1930

1 Claim. (Cl. 175—182)

This invention relates to the determination of the nature of the sub-soil and to the detection or location of electrically conducting minerals, metals or metalliferous deposits.

Hitherto the various alternating current electrical methods that have been suggested or employed for this purpose fall into two categories according to their nature and the apparatus and principles involved; namely the surface potential methods which include the well-known equipotential line method, and the electromagnetic methods. The known surface potential methods are unsatisfactory and often break down completely in the vicinity of a conductive body (that is, just where accuracy is most needed) due to the effect of phase differences which prevent true observations being made. The known apparatus is incapable of overcoming this difficulty and is entirely unsuited for the utilization of these phase difference effects, which in themselves are of great value in the location of mineral deposits. For the same reason amongst the electromagnetic methods there is no generally known apparatus that is suitable for the direct or instantaneous comparison of the alternating magnetic fields at different observation points in the neighbourhood of conductive deposits since it is necessary that such apparatus should be capable of taking account of and measuring the phase displacements.

The object of the present invention is to devise a method of and apparatus for making accurate investigations of surface potentials and phase relations such as are not possible by the equipotential line or other generally known electrical methods, the system according to the invention being simple in application and of great value both for direct prospecting purposes and for making detailed examinations of indications obtained by other methods.

The invention consists in a method of determining the nature of the sub-soil and detecting or locating minerals or metalliferous deposits which comprises passing an alternating current through the earth between distant or spaced earthed electrodes, producing an exact balance in potential and phase between pairs of points in the area through which the current is passed, and from a series of measurements of these potentials and phase angles along lines of traverse in said area plotting potential and phase variation curves upon a suitable chart or otherwise plotting, observing or determining the results.

The invention also consists in apparatus for carrying out the above method which comprises a bridge, or semi-bridge, in each of the two ratio arms of which is arranged a suitable impedance, which may be a resistance, capacity or inductance or any combination of such arranged in series or in parallel or in series-parallel.

Further features of the invention will be apparent from the description given hereafter.

The accompanying drawing illustrates two modes of carrying out the invention.

Figure 1:
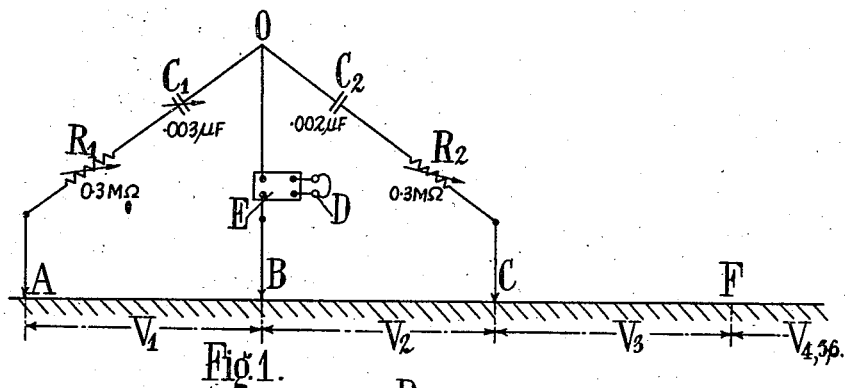
Figure 1 is a diagram of one form of apparatus in accordance with the invention.

In carrying the invention into effect in one convenient manner as shown in Figure 1, a bridge or semi-bridge is constructed with two ratio arms, in one of which there is a fixed or variable resistance $R_1$ and a variable capacity $C_1$ in series, while in the other there is a variable resistance $R_2$ with or without the capacity $C_2$, the values and ranges of the capacities and resistances being suitably chosen in accordance with the conditions under which the apparatus is to be employed and being preferably such that there is a minimum impedance of the order of 100,000 ohms maintained in each arm.

The free ends of the two arms are connected to suitable earth conductors A and C while the junction O of the two arms is connected to a third earth conductor B and in the circuit of this third conductor there is disposed a suitable headphone D with or without any convenient amplifying arrangement E.

The earth conductors or electrodes may conveniently be formed from short lengths of light drill steel pointed at one end and fitted with a brass or other conducting collar soldered or brazed to the steel at a point somewhat below the striking end, the collars or the like forming connections by means of which the insulated leads from the bridge may be conveniently connected to the electrodes by large sized battery clips or other terminal or connecting devices.

It is convenient and also good practice to employ a fourth electrode which should always be put into position at the next successive station on the traverse (as at F) while the observations are being made on those immediately preceding it so that in this way there is no necessity to move the two forward electrodes BC after an observation has been made since they are then already in position to serve as the two rear electrodes for the next succeeding observation.

In operation an alternating current at about 500 cycles per second (or other suitable frequency) is passed through the ground between distant earth electrodes (not shown) by means of an alternating current generator (much in the same manner as is adopted in the equipotential line method); the area to be surveyed being conveniently marked out in a series of parallel, radiating or intersecting straight line traverses along which are marked points (which for convenience may be equidistant, for example, at intervals from 10 to 100 feet or more apart) at which successive observations are to be made.

The operator connects the bridge and headphones and also the amplifier when such is employed, and arranges the electrodes at three successive observation points, the outer two of which are in connection with the free ends of the ratio arms of the bridge while the intermediate electrode is connected to the detecting circuit (e. g. headphones and amplifier) and thence to the junction of the ratio arms. With this disposition of apparatus the operator adjusts the capacity and resistances until an exact balance of potential and phase is indicated by silence in the headphones, and when this condition has been obtained the potential drops $V_1$ and $V_2$ between the first and second, and the second and third points are directly proportional to the total impedance in the respective ratio arms or in terms of resistance $R_1$ and $R_2$ and capacitative reactances $X_1$ and $X_2$ directly recorded from the instrument:

$$V_2 = \frac{R_2 \sin \tan^{-1}(R_1/X_1)}{R_1 \sin \tan^{-1}(R_2/X_2)} V_1$$

and $$\theta_2 - \theta_1 = \tan^{-1} R_2/X_2 - \tan^{-1} R_1/X_1$$

where $\theta_2 - \theta_1$ is the difference in phase angle between $V_2$ and $V_1$; being of positive value when $V_2$ is leading $V_1$ and vice versa.

Figure 3:
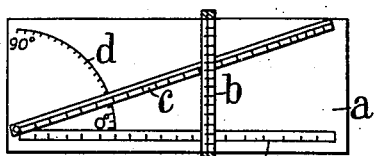
Figure 3 is an elevation of a plotting device to be used with the apparatus.

In practice the potential and phase values may be computed or determined graphically or they may be obtained directly and expeditiously on a specially designed sliding scale device shown in Figure 3 and which, for example, may comprise a wood or other base-board $a$ along the bottom of which a scale $a'$ of capacity reactances is marked while the resistance values are marked upon a celluloid or other transparent cursor $b$ which slides over the surface of the board at right angles to the reactance scale. A second celluloid or like strip $c$ graduated in any convenient scale is rotatable about the zero point of the reactance scale, which point also marks the centre point of a 90° protractor $d$ engraved on the base-board. To operate the device the cursor is adjusted to the reactance value on the reactance scale and the vector arm is moved beneath the cursor to a position such that its centre line passes through the resistance value on the cursor. The length of the vector arm intercepted between the point of rotation and the centre line of the cursor and the angle which the vector arm makes with the reactance scale can then be directly read off and entered as part of the observations, and from a series of observations, curves of potential and phase variation may be plotted upon a suitable chart, which curves will give a variable indication of the conductivity of the sub-soil in the area being surveyed and therefore will be found to reveal important features that may not even be suspected from the usual type of surface potential survey.

If preferred the potential and phase variations over the surveyed area as a whole may be shown (after vectorial addition) by drawing equipotential and iso-phase lines on a plan; such lines being given values that refer to the potential existing at any point or to the potential difference existing between any pair of points in the area that may be selected as a convenient arbitrary unit or datum.

Preferably the apparatus employed is provided with a reversing switch (such as is shown at S in Figure 4) so that two observations may be taken at each station whereby not only is increased accuracy obtained by using the mean of the two observations but they afford a valuable check on the behaviour of the instrument and reveal any errors in adjustment or computation.

Figure 4:
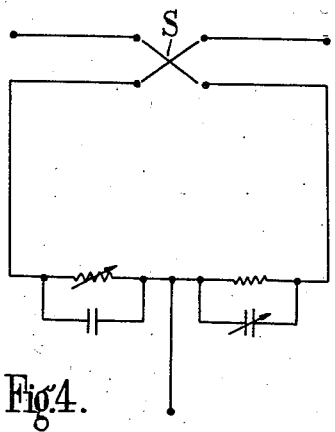
Figure 4 is a diagram of a detail modification.

In a modification of the invention shown in Figure 4 the resistance and capacity in each ratio arm of the bridge may be connected in parallel instead of in series, and if the variable capacities and resistances are graduated so that the conductances and the susceptances are in the same units (the unit employed being, for example, the conductance of a 300,000 ohm resistance) it can be shown by a mathematical analysis that the various portions of the variable capacity come out to be whole numbers within an error of 1 per cent. at most so that the arrangement simplifies the calibration and reading of the instrument and greatly facilitates the working out of the results.

In some cases there may be employed a variable resistance alone in one ratio arm and a fixed resistance and variable condenser in parallel in the other arm. By such an arrangement a larger phase angle range is available, and if the in-phase components be used then the apparatus becomes direct reading.

The invention will be found to provide highly sensitive means of investigating phase and potential variations in areas in which alternating current is passed conductively through the ground, and in particular it is often of great value as an auxiliary to the equipotential line method which although of admitted value for reconnaissance purposes is too crude for detail investigation for reasons above indicated.

Figure 2:
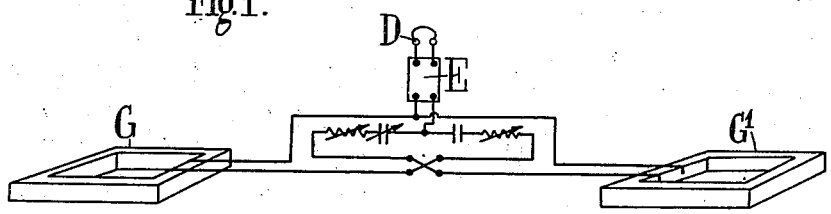
Figure 2 is a diagram of an alternative form of apparatus.

In a further modification of the invention the improved ratio arm bridge may be employed as shown in Figure 2 in association with search coils GG' in an electromagnetic method for a comparison of field intensities and differences of phase angle, a pair of search coils in the area being, for example, employed and being connected together by two wires preferably twisted together in which part of the circuit the ratio arm bridge is included, the free ends of the ratio arms being inserted into one of the wires while the junction of the arms is connected to the other wire and the connections being such that the electromotive forces induced in the two search coils assist one another and are not opposed.

In this electromagnetic method, the electromagnetic field may be generated either by passing alternating current through the ground between earthed electrodes or preferably by means of a loop of wire, insulated from the ground and connected to a source of alternating current. In the latter case the loop is usually large and includes the whole area to be examined. This primary field acts inductively on a buried conductive deposit and produces a secondary out-of-phase field. The apparatus in question is designed to search for and investigate such secondary fields, since they are a sure indication of buried conductive bodies. The ratios between the various components of the field may be determined for a series of points along lines of traverse and the results plotted as intensity and phase variation curves or in the form of iso-phase and iso-intensity lines as described in connection with Figure 1.

Although the invention has been described particularly with reference to surveys carried out upon the surface it will be understood that it is equally applicable to surveys in connection with underground workings and also in connection with the investigation of shafts and bore holes.

In the last-mentioned application, for example, the earth conductors instead of being disposed on the surface of the ground are lowered into the shaft or bore hole and are disposed so as to make contact with the wall thereof. After a measurement has been made in the manner already described for the surface application of the method the conductors on electrodes are raised or lowered until they occupy new positions on which further measurements are made and from a series of such measurements potential and phase variation profiles may be constructed in the manner previously described and from these profiles valuable information may be obtained regarding the electrical conductivity and character of the formation in which the shaft or bore hole is situated. As in the method previously described the alternating current may be passed through the ground between distant or spaced electrodes or alternatively one of the electrodes may be placed close to the mouth of the shaft or bore hole (the other electrode being remote from the same) and with this arrangement the potential differences $V_1$ $V_2$, etc., have reference to concentric equipotential surfaces, the centre of which is at the electrode adjacent the shaft or bore hole.

It is to be understood that the invention is not to be limited to any particular details of construction as regards the various parts of the apparatus required as the form of electrodes, amplifier and bridge may be modified and there may be adapted any other type of indicator in place of the headphones according to any particular practical requirements that may have to be fulfilled.

I claim:

A method of determining the nature of the sub-soil and detecting or locating minerals, metals or metalliferous deposits wherein an alternating current is passed through the area under exploration between two electrodes which are permanently fixed in position during exploration of that area, and, by means of three movable electrodes connected to variable impedance ratio arms step-by-step readings of potential ratio are taken by placing the movable electrodes at successive points anywhere within the area under exploration, the distances between these points being small compared with the distance between the permanently fixed electrodes and each reading comprising the instantaneous comparison of phase and potential differences between currents flowing between any two pairs of the three points at which the movable electrodes are placed.

ARTHUR BROUGHTON BROUGHTON-EDGE.